US008997597B2

(12) United States Patent
Rupp et al.

(10) Patent No.: US 8,997,597 B2
(45) Date of Patent: Apr. 7, 2015

(54) POWER STEERING SYSTEM

(75) Inventors: Arthur Rupp, Huettlingen (DE);
Steffen Truthmann, Magdeburg (DE)

(73) Assignee: ZF Lenksysteme GmbH, Gmuend (DE)

( * ) Notice: Subject to any disclaimer, the term of this patent is extended or adjusted under 35 U.S.C. 154(b) by 463 days.

(21) Appl. No.: 13/599,185

(22) Filed: Aug. 30, 2012

(65) Prior Publication Data
US 2013/0228026 A1 Sep. 5, 2013

Related U.S. Application Data

(63) Continuation of application No. PCT/EP2011/053794, filed on Mar. 14, 2011.

(30) Foreign Application Priority Data

Mar. 22, 2010 (DE) .................. 10 2010 003 105

(51) Int. Cl.
*B62D 3/06* (2006.01)
*B62D 5/04* (2006.01)
*F16H 25/24* (2006.01)
*F16H 55/48* (2006.01)

(52) U.S. Cl.
CPC ............ *B62D 3/06* (2013.01); *Y10T 74/18576* (2015.01); *B62D 5/0424* (2013.01); *B62D 5/0448* (2013.01); *F16H 25/24* (2013.01); *F16H 55/48* (2013.01); *F16H 2025/249* (2013.01)

(58) Field of Classification Search
CPC ............................ B62D 5/0424; B62D 5/0448
USPC ....................... 180/433; 74/388 PS
See application file for complete search history.

(56) References Cited

U.S. PATENT DOCUMENTS

| 6,644,432 | B1 * | 11/2003 | Yost et al. ............... | 180/444 |
| 7,044,263 | B2 | 5/2006 | Fischbach et al. | |
| 7,189,176 | B2 * | 3/2007 | Sakaida et al. ............... | 474/148 |
| 8,042,645 | B2 * | 10/2011 | Kurokawa ............... | 180/444 |
| 8,348,009 | B2 * | 1/2013 | Knoedler et al. ............ | 180/444 |
| 8,485,307 | B2 * | 7/2013 | Ji et al. ............... | 180/444 |
| 8,505,676 | B2 * | 8/2013 | Yamamoto ............... | 180/444 |
| 8,540,258 | B2 * | 9/2013 | Bae et al. ............... | 280/93.515 |
| 2004/0095016 | A1 | 5/2004 | Bayer et al. | |
| 2004/0104067 | A1 | 6/2004 | Fishbach et al. | |
| 2013/0161114 | A1 * | 6/2013 | Bando et al. ............... | 180/443 |
| 2014/0260727 | A1 * | 9/2014 | Webber et al. ............... | 74/89.23 |

(Continued)

FOREIGN PATENT DOCUMENTS

DE             103 10 492         9/2004
DE        10 2004 058 963         6/2006

(Continued)

*Primary Examiner* — Nicole Verley
(74) *Attorney, Agent, or Firm* — Jordan and Hamburg LLP

(57) ABSTRACT

A power steering system, and more particularly a power-assisted steering system for a vehicle, comprises a lead screw which is driven by a servo motor and is composed of a nut, which is mounted axially non-displaceably in a frame, and an axially displaceable component, the thread of which is engaged with a thread of the nut, and further comprising a belt pulley, which is non-rotatably connected to the nut and forms part of a traction mechanism gear between the servo motor and the nut, wherein the nut is mounted in the frame by a rolling bearing. So as to provide a power steering system which produces little noise and is easy to install, very precise in operation and also cost-effective to produce, the belt pulley is produced from plastic.

8 Claims, 4 Drawing Sheets

(56) References Cited

U.S. PATENT DOCUMENTS

2014/0291062 A1* 10/2014 Tojo ............................. 180/443
2014/0345966 A1* 11/2014 Asakura et al. ............... 180/444

FOREIGN PATENT DOCUMENTS

| DE | 10 2007 049 114 | | | 4/2009 |
|---|---|---|---|---|
| DE | 10 2008 001 959 | | | 12/2009 |
| DE | 102009046386 | A1 | * | 5/2011 |
| DE | 102009047321 | A1 | * | 6/2011 |
| DE | 102010002892 | A1 | * | 9/2011 |
| DE | 102010038715 | A1 | * | 2/2012 |
| DE | 102010062777 | A1 | * | 6/2012 |
| DE | 102011116058 | A1 | * | 4/2013 |
| DE | 102011117723 | A1 | * | 5/2013 |
| DE | 102011056031 | A1 | * | 6/2013 |
| WO | WO-02/076808 | | | 10/2002 |
| WO | WO-2005/047735 | | | 5/2005 |
| WO | WO 2011015374 | A1 | * | 2/2011 |
| WO | WO 2014170125 | A1 | * | 10/2014 |

* cited by examiner

POWER STEERING SYSTEM

This is a Continuation of PCT/EP2011/053794 Filed Mar. 14, 2011.

BACKGROUND OF THE INVENTION

The invention relates to a power steering system, and more particularly to a power-assisted steering system for a vehicle, comprising a lead screw which is driven by a servo motor and composed of a nut, which is mounted axially non-displaceably in a frame, and an axially displaceable component.

Power steering systems, and more particularly electrical power-assisted steering systems in passenger cars, in which the servo motor transmits the rotational speed and torque via a traction mechanism gear to a nut, and more particularly a recirculating ball nut, are known from the prior art. To this end, a servo motor and the toothed rack, or the spindle section of the rack, driven by the nut, are frequently disposed axially parallel to each other.

For example, DE 103 10 492 A1 describes an electrical power steering system, wherein an electric motor drives a component which is mounted in a steering gear housing so as to be axially displaceable. The component is designed as a toothed rack, and a ball screw of the component is mounted in engagement with a nut thread of a frame designed as the steering gear housing in an axially non-displaceable manner. The nut is non-rotatably connected to a belt pulley of a traction mechanism gear between the servo motor and the lead screw thus formed. The nut is supported and mounted on the steering gear housing by way of a radial fixed bearing, which is a rolling bearing. The radial bearing is frequently designed as a four-point bearing, especially since axial forces must also be absorbed. An inner ring of the rolling bearing is axially supported on the components mounted on the nut, such as the belt pulley and a stop in form of a ring or snap ring.

The belt pulley is made of a metal material, and therefore the sound radiation and conduction thereof may be problematic, in particular because the weight of such belt pulleys is not minimized, resulting in non-minimized mass moments of inertia during rotation, when such traction mechanism gears are being operated. The known power steering systems moreover have long tolerance chains, which are not desirable.

SUMMARY OF THE INVENTION

Proceeding from this prior art, it is the object of the invention to provide a power steering system which produces little noise and is easy to install, very precise in operation and also cost-effective.

By producing the belt pulley, which is non-rotatably connected to the nut, from a plastic material, and more particularly from an engineering plastic material or high-performance plastic material, a design measure is provided which allows operating noise, such as impact noise of a toothed belt in teeth interstices and on teeth of a belt pulley designed as a toothed disk, to be reduced. The sound radiation and sound conduction are also advantageously influenced on the belt pulley by this measure. In addition, the manufacturing costs of the power steering system are thereby reduced.

In a particularly preferred embodiment, the belt pulley is fixed on the nut by way of being pushed onto an outer circumferential surface of the nut so as to be seated against a radially directed stop on the nut.

The inner ring of the rolling bearing is then moved against axial stops formed directly by the nut, or against a stop which is held by a snap ring or the like engaging on the nut.

The radially directed stop for the inner ring can be a circumferential collar of the nut, which can define a stop plane which will be congruent with a radial end face of the belt pulley. The belt pulley can thus be axially secured in the other direction thereof by the inner ring serving as a counter stop. The inner ring thus establishes direct contact with an axial stop of the nut, which shortens the tolerance chain as compared to solutions according to the prior art. The belt pulley may be pushed on the nut for this purpose and connected to the nut by a radially positive connection, such as a splined or toothed shaft connection, which can also be implemented by only two mutually engaging tongues and grooves on the respective components. It is also possible to use any other rotationally fixed connection formed by a shaft connection, which has cross-sections different from a circular shape (for example polygonal connection). It may also be expedient to mold the belt pulley on the nut as a plastic injection-molded part on the nut or connect it non-positively and positively to the nut in another manner.

It is recommended to use engineering plastics such as polyamide, polyoxymethylene or polyethylene terephthalate for producing the belt pulley. Polyamides (PA) are the most important engineering plastics in which the basic building blocks are joined to each other by carboxylic acid amide groups. There are two different groups of polyamides: the polyamide 6-type, the basic material of which is produced by the polycondensation of ω-aminocarboxylic acid or polymers of the lactams thereof, or the polyamide 66-type, the basic material of which is produced by the polycondensation of diamines and dicarboxylic acids. Differences between the various polyamides are caused by varying crystallinity, the ratio of $CH_2$—/CONH groups in the polymers, an even- or odd-numbered carbon atomic number and the distance between adjacent macromolecules, and thus the crystallinity degree thereof. The properties of polyamides, such as flexural strength, surface hardness and the like, can be considerably influenced by additives such as glass fibers, glass spheres, mineral powders, carbon fibers or graphite and molybdenum sulfide. Semi-crystalline polyamides have high to medium strength and medium stiffness, low hardness, good to excellent impact resistance and good sliding and wear properties. Polyoxymethylene (POM) has medium to high strength (endurance strength) and stiffness, and is suitable for the production of components having tight tolerances, such as gear wheels and the like. Polyethylene terephthalate (PET) has high stiffness and hardness and high abrasion resistance. It also exhibits good thermal expansion and is well-suited for the production of a belt pulley according to the invention.

High-performance plastics such as polyaryletherketones, for example polyetheretherketone or polyetherketone, exhibit high mechanical endurance strength and good sliding and wear behavior. They retain the good strength properties thereof at temperatures of more than 250° C.

The belt pulley may be floatingly attached to the nut, so that it is attached to the nut over half of the extension thereof, for example. A portion of the running surface of the belt is located outside the axial region of the nut, wherein reinforcement ribs on the belt pulley assure the necessary rigidity and can be integrally formed when producing the belt pulley, for example by injection molding. The belt pulley may also be attached to the nut only over approximately ⅓ of the axial length thereof. The power steering system is preferably designed as an electrical power steering system having an axially parallel arrangement of the servo motor and toothed rack.

LIST OF REFERENCE NUMERALS 1 power steering system
2 lead screw 3 frame
4 nut
5 component, axially displaceable
6 thread
7 nut thread
8 belt pulley
9 rolling bearing
10 inner ring
11 stop
12 stop
13 plane
14 end face of 11
15 end face of 12
16 tongue-and-groove connection
17 axial stop
18 toothed rack power-assisted steering system
19 steering gear housing
20 toothed rack
21 spindle section
22 ball screw
23 23' bearing disk
24 reinforcement rib
25 flange region
26 26' tongue
27 groove
28 collar
29 toothing on 8
X installation direction
I extension, axial
$d_1$ outside diameter of 4
$d_2$ outside diameter of 4
$d_3$ outside diameter of 4

The invention will now be described in more detail based on an exemplary embodiment and illustrated based on the accompanying drawings.

DESCRIPTION OF THE PREFERRED EMBODIMENTS

Figure 1:
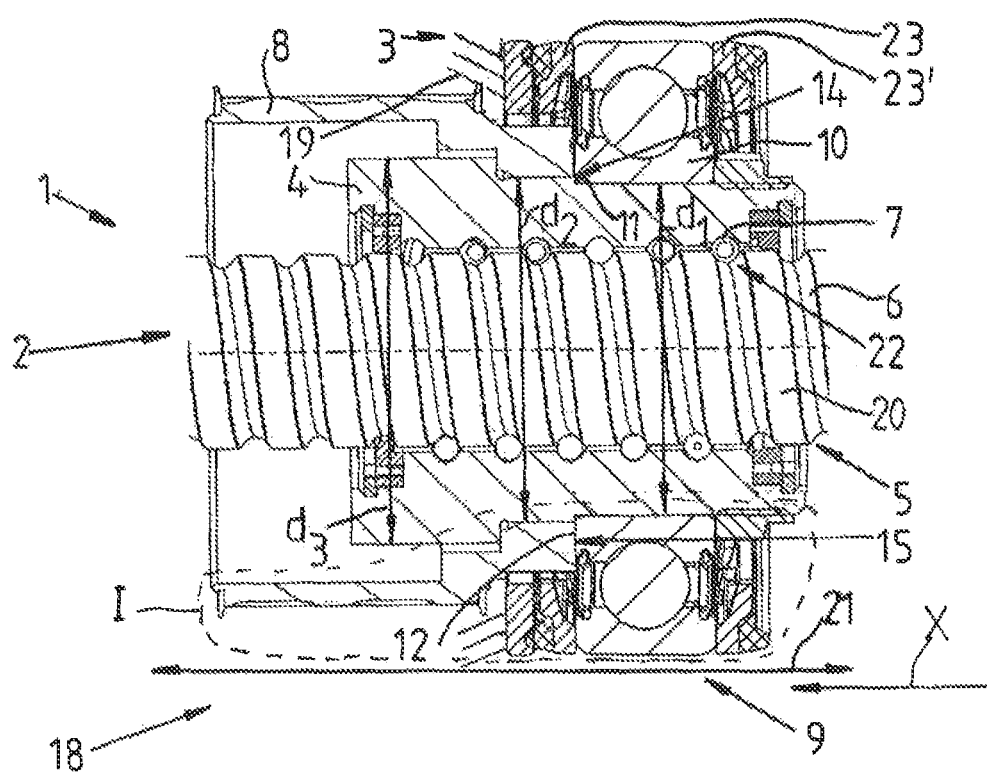
FIG. 1 is a partial schematic longitudinal section of a power steering system according to the invention.

FIG. 1 is a partial longitudinal section of a power steering system 1, designed as an electrical toothed track power-assisted steering system 18, for a passenger car or a commercial vehicle. An axially displaceable component 5, which is designed as a toothed rack 20, is mounted in a frame 3 designed as a cylindrical steering gear housing 19. Parallel to the toothed rack 20, an electrical servo motor, which is not shown, is fixed to a radial flange of the steering gear housing 19. On a toothing section (not shown), the toothed rack 20 meshes with a pinion (not shown) on a steering shaft and on a spindle section 21 comprises a thread 6 designed as a ball screw 22, which is engaged with a thread 7 of a nut 4 designed as a recirculating ball screw. The nut 4 and the spindle section 21 form a lead screw 2. The nut 4 is non-rotatably connected to a belt pulley 8 designed as a toothed disk (refer to FIGS. 2, 3) and held in a housing cover (not shown) of the steering gear housing 19 by way of a rolling bearing 9 designed as a radial bearing. The rolling bearing 9 is designed as a fixed bearing and is able to transmit axial and radial forces from the nut 4 to the frame 3.

Figure 1A:
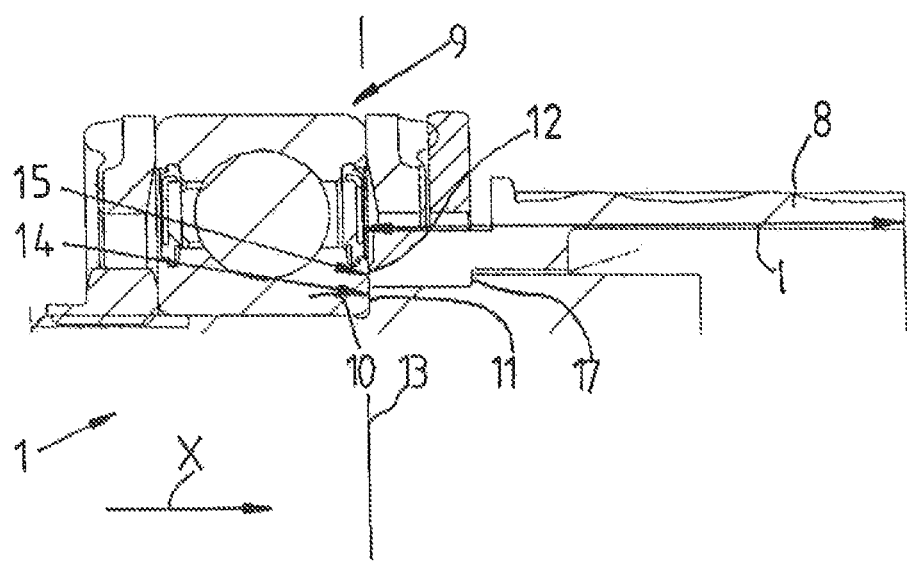
FIG. 1a is a section I of FIG. 1.

As is shown in detail I in FIG. 1a, on the outer circumference thereof, the nut 4 has two abrupt changes in diameter between which the contour of the nut 4 is cylindrical. As viewed from the outer circumferential side, the nut 4 forms a stepped cylinder. The outside diameter $d_1$ of the nut 4 is smallest in the radial region of the rolling bearing 9. This diameter corresponds to the inside diameter of an inner ring 10 of the rolling bearing 9. As seen looking from an installation direction X in the viewing direction of FIG. 1 from right to left, the inner ring 10 is pushed onto the nut 4 and is seated against an end face 14 of the first diameter jump forming a stop 11. In the region of the stop 11, the nut 4 has an outside diameter $d_2$, which corresponds to the first outside diameter $d_1$ plus approximately half the thickness of the inner ring 10. As seen looking in the viewing direction further to the left, a further diameter jump to a larger diameter $d_3$ is apparent on the outer circumferential surface of the nut 4, wherein the increase in diameter to $d_3$ can be approximately half as large as the increase in diameter from $d_1$ to $d_2$, as is illustrated in FIG. 1a.

The second jump in diameter from an outside diameter $d_2$ to $d_3$ serves as an axial stop 17 for the belt pulley, which thereby rests on the nut 4 so that the end face 15 of the pulley is located in a plane 13 with the end face 14 of the nut 4 at the first diameter jump.

During installation, the belt pulley 8 can thus be first pushed onto the nut 4 with the installation direction X and then the rolling bearing 9 can be pushed on in the same installation direction X, until reaching the stop of the inner ring 10 on the end face 14 or the stop 11 of the nut 4, and also on the end face 15 or stop 12 at the belt pulley 8.

Figure 2:
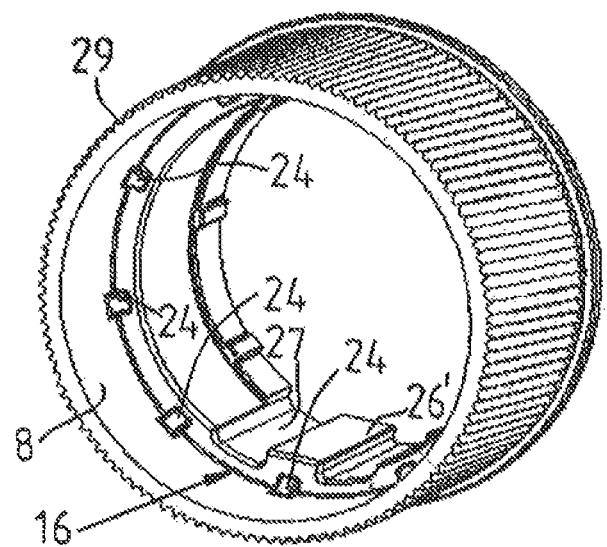
FIG. 2 is a perspective view of an exemplary embodiment of a belt pulley made of plastic.

Bearing disks 23, 23' axially disposed on both sides of the rolling bearing 9 fix the rolling bearing 9 on the nut 4. The belt pulley 8 is placed with approximately half of the axial extension I thereof over the nut 4. The other half of the belt pulley 8, on which a traction mechanism, and more particularly a toothed belt, runs is floatingly arranged. This is possible because, as is shown in FIG. 2, reinforcement ribs 24 are integrally formed radially around the inner circumference of the belt pulley 8, which project from the actual flange region 25 of the belt pulley 8 in a wedge-shaped tapering manner and help to reinforce the running surface of the traction mechanism.

Figure 3:
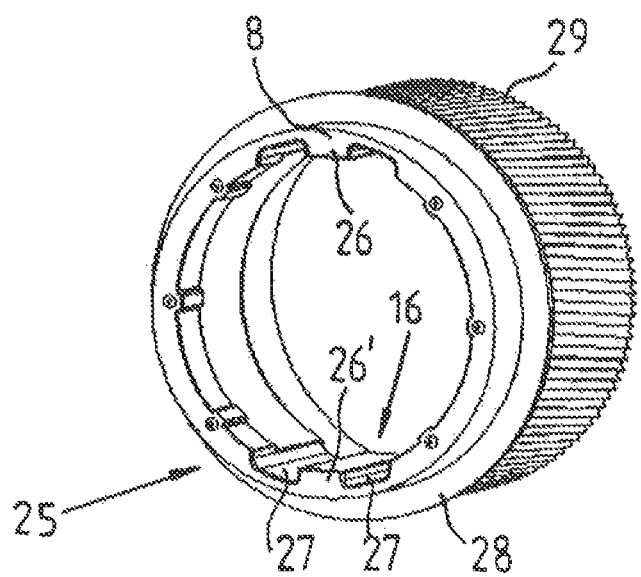
FIG. 3 is a perspective view of the belt pulley of FIG. 2 from the installation side thereof on the nut.

As is apparent in particular from FIG. 3 in a perspective view of the belt pulley 8 from the flange side thereof, a tongue-and-groove connection 16 is provided between the nut 4 and the belt pulley 8, wherein a wide tongue 26 is integrally formed diametrically relative to a tongue 26' from the inner circumferential surface of the belt pulley 8, for the rotationally locked engagement of the nut 4 in a respective groove on the outer circumference.

The tongues 26, 26' in turn are laterally delimited by a respective groove 27, in which two respective tongues on the nut 4 can engage. This creates a positively detachable, non-rotatable connection between the belt pulley 8 and nut 4 in the manner of a tongue-and-fork joint.

Toward the flange side 25, the belt pulley 8 has a collar 28, while an axially opposing end of the belt pulley 28 ends in the toothing 29 thereof without a collar.

The invention claimed is:

1. A power steering system, and more particularly a power-assisted steering system for a vehicle, comprising a lead screw which is driven by a servo motor and is composed of a nut, which is mounted axially non-displaceably in a frame, and an axially displaceable component, the thread of which is engaged with a thread of the nut, and further comprising a belt pulley, which is non-rotatably connected to the nut and forms part of a traction mechanism gear between the servo motor and the nut, the nut being mounted in the frame by a rolling bearing, the belt pulley being produced from a plastic material, an inner ring of the rolling bearing being axially seated against a radially directed stop, which is formed integrally with the nut, and against a stop, which is formed integrally with the belt pulley and located in the same plane as the stop of the nut.

2. A power steering system according to claim 1, wherein the stop of the nut and the stop of the belt pulley for the inner ring are ring end faces which are disposed concentrically on top of each other.

3. A power steering system according to claim 1, wherein the belt pulley is connected to the nut by a radially positive connection, such as a splined or toothed shaft connection or a different tongue-and-groove connection, or is bonded to the nut.

4. A power steering system according to claim 1, wherein the belt pulley is pushed onto the nut in the same installation direction as the rolling bearing, until reaching an annular axial stop of the nut.

5. A power steering system according to claim 1, wherein the belt pulley is produced from an engineering plastic material such as polyamide, polyoxymethylene, polyethylene terephthalate, or a high-performance plastic material such as polyetheretherketone or polyetherketone, and is designed as a V-belt, V-ribbed belt or toothed belt pulley.

6. A power steering system according to claim 1, wherein the belt pulley projects with approximately half of the axial extension thereof over the nut.

7. A power steering system according to claim 1, wherein the belt pulley rests with approximately ⅓ of the axial extension thereof on the nut.

8. A power steering system according to claim 1, wherein the power steering system is an electrical power-assisted steering system having an axially parallel arrangement of an axially displaceable component and servo motor.

\* \* \* \* \*